Sept. 26, 1961 S. D. VIGREN ET AL 3,002,057

POLARIZED ELECTROMAGNETIC DEVICE

Filed March 25, 1957 4 Sheets-Sheet 1

INVENTORS

STEN DANIEL VIGREN

PER HARRY ELIAS CLAESSON

ROLF ALBIN ZANDER

BY

Shauch, Nolan & Neale

ATTORNEYS

INVENTORS
Sten Daniel Vigren
Per Harry Elias Claesson
Rolf Albin Zander
BY Strauch, Nolan & Neale
ATTORNEYS

POLARIZED ELECTROMAGNETIC DEVICE

Filed March 25, 1957 4 Sheets-Sheet 3

INVENTORS
Sten Daniel Vigren
Per Harry Elias Claesson
Rolf Albin Zander

BY Strauch, Nolan & Neale
ATTORNEYS

Sept. 26, 1961 S. D. VIGREN ET AL 3,002,057

POLARIZED ELECTROMAGNETIC DEVICE

Filed March 25, 1957 4 Sheets-Sheet 4

INVENTORS
STEN DANIEL VIGREN
ROLF ALBIN ZANDER
PER HARRY CLAESSON

BY Strauch, Nolan & Neale
ATTORNEYS 3,002,057

POLARIZED ELECTROMAGNETIC DEVICE

Sten Daniel Vigren, 16–18 Mose Backetorg, Stockholm, Sweden, Per Harry Elias Claesson, 4 Sportstugevagen, Danderyd, Sweden, and Rolf Albin Zander, 5 Ivar Vidfamnesgatan, Stockholm, Sweden Filed Mar. 25, 1957, Ser. No. 648,056
Claims priority, application Sweden Mar. 29, 1956
11 Claims. (Cl. 179—114)

The present invention relates to polarized electromagnetic devices such as telephone receivers of the electromagnetic type and polarized relays.

Polarized electromagnetic devices are previously known which comprise two pole pieces, each having two poles. The pole pieces are arranged so that the two poles on one pole piece are facing the poles on the other pole piece. An armature has one end clamped between two poles and its other end movably positioned between the other two poles. One or more permanent magnets are provided between the pole pieces to produce the polarizing flux, and an energizing coil is provided to produce a control flux through the armature. These known devices suffer from the drawback that about one half of the flux from the permanent magnets passes through the poles between which the armature is clamped, and this part of the flux cannot be utilized.

In the known devices it is further necessary to provide spacers between the fixed end of the armature and the poles which causes a relatively high magnetic reluctance for the control flux, and furthermore it is important that the gaps between the fixed end of the armature and the poles are of exactly the same size, because practically all the magnetic reluctance between the armature and the pole pieces is concentrated to these small gaps. The high accuracy required in the size of these gaps causes difficulties in manufacture.

Another drawback of the said known devices lies in the fact that the armature must be relatively thin in order that it shall not be too stiff. Therefore the armature does not offer a sufficiently low reluctance to the permanent flux which may pass lengthwise of the armature in case of asymmetry in the permanent flux circuit.

It is an object of the present invention to provide a polarized electromagnetic device with an improved magnetic structure which permits effective utilization of the permanent flux so that a small sized permanent magnet can be used for producing adequate polarization, and which offers a low reluctance to the control flux.

It is another object of the invention to provide a polarized electromagnetic device with improved means for suspending the armature.

It is a further object of the invention to provide improved connecting means for supplying energizing current to the device.

It is still another object of the invention to provide a telephone receiver of the electromagnetic type having improved frequency response characteristics.

In a preferred embodiment of the invention the magnetic structure of the polarized device has two pole pieces in contact with either pole of a permanent magnet and having end portions facing each other to form an air gap. The armature is mounted midway between the pole pieces and has its pivotal axis located adjacent to the permanent magnet and a portion located in said air gap. The energizing coil is positioned between the permanent magnet and the air gap and surrounds part of the armature, so that current through the coil winding sets up a control flux in the armature. The control flux passes from the armature to the pole pieces through the permanent magnet which offers only a small reluctance to the control flux provided that it is made of a material having a fairly high permeability. The distances between the armature and the two pole pieces as measured adjacent to the permanent magnet are comparatively large, and small differences between them are of no consequence. Practically all of the flux from the permanent magnet passes through the said facing portions of the pole pieces and through the air gap therebetween and is thus utilized to produce the desired polarization.

These and other objects and features of the invention will appear from the following description of some embodiments of the invention with reference to the accompanying drawings.

Figures 1, 2:
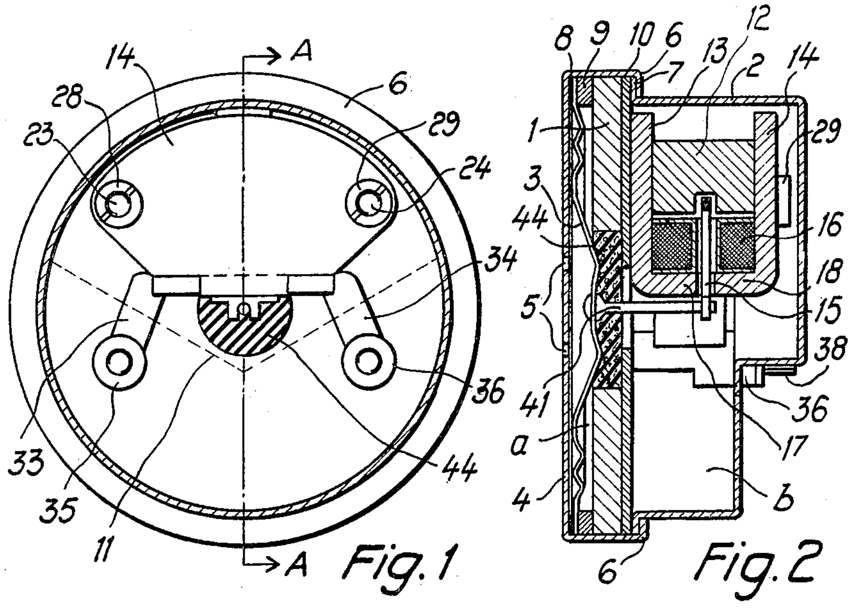
FIGURE 1 shows a rear view of a telephone receiver of the electromagnetic type with part of the casing removed to show the interior parts.
FIGURE 2 is a section taken along lines A—A in FIGURE 1.
Figure 3:
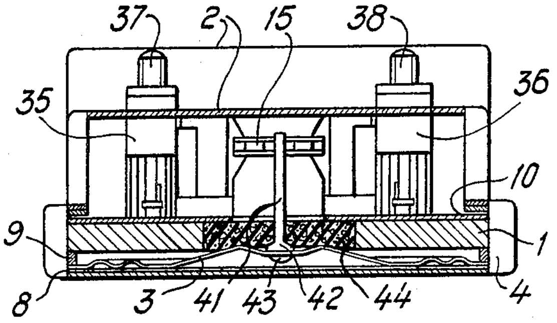
FIGURE 3 is a side view of the same receiver with parts of the casing removed and some parts shown in cross section.
Figure 4:
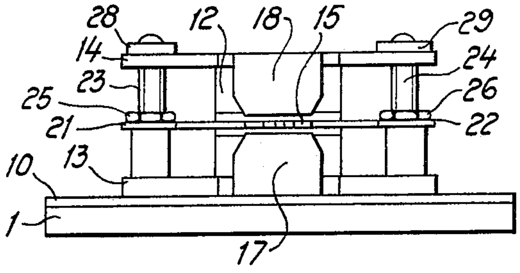
FIGURE 4 shows a front view of the magnetic system and the means for suspending the armature in the receiver.

Referring now to FIGURES 1–11 which show the telephone receiver and various details thereof, the receiver comprises a base plate 1, a rear cover or casing 2, a diaphragm 3, and a front cover 4 having apertures 5 for the passage of sound. The front cover 4 has a portion 6 folded around the edges of base plate 1, diaphragm 3 and a flange 7 of casing 2 so as to clamp these parts to each other. Annular spacing members 8 and 9 are provided between diaphragm 3 and front cover 4 and between diaphragm 3 and base plate 1 respectively. A disc 10 the purpose of which will be described later, is also clamped against base plate 1.

The bottom portion of casing 2 is stepped as will be seen from FIGURE 2, the outline of the step being indicated by dash line 11 in FIGURE 1.

The magnetic system of the receiver includes a permanent magnet 12, pole pieces 13 and 14, an armature 15 and an energizing coil 16. Pole pieces 13 and 14 have end portions 17 and 18 respectively facing each other to form an air gap in which a portion of armature 15 is positioned.

Figure 5:
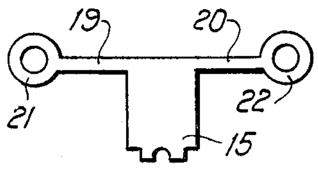
FIGURE 5 is a top plan view of the armature in the receiver.

As will be seen from FIGURE 5 the armature 15 has two arms 19 and 20 extending from the end of the armature nearest to the permanent magnet in alignment with each other and at right angles to the longitudinal direction of the armature. The ends of arms 19 and 20 are formed as loops 21 and 22 respectively. These loops are clamped to shoulders on clamping and supporting posts 23 and 24 (FIGURE 4) by means of nuts 25 and 26 screwed on threaded portions of the posts 23 and 24. Thus the angular motion of the armature takes place under torsion in arms 19 and 20.

The armature 15 may have a comparatively large thickness e.g. 1–2 mm. to offer a low reluctance to the permanent flux which may occasionally pass lengthwise through it in case of asymmetry in the permanent flux circuit. In such case the arms 19 and 20 which may be integral with the armature, should have a thickness smaller than that of the armature so as not to offer a too high resistance to the angular motion of the armature.

Figure 6:
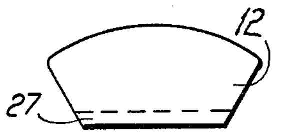
FIGURES 6 and 7 show the permanent magnet of the receiver in top plan view and side view respectively.
Figure 7:
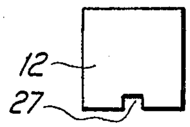

In order that the magnetic reluctance between the armature and the permanent magnet shall be as small as possible, the permanent magnet is provide with a groove 27 as shown in FIGURES 6 and 7, and the rear end of the armature 15 is positioned in this groove. This groove also makes it possible to reduce the distance between the permanent magnet 12 and the air gap between the end portions 17 and 18 of the pole pieces 13 and 14 whereby the stray flux is reduced.

The posts 23 and 24 are attached to the base plate 1 in some known manner (not shown in the drawings), and besides serving as supports for the armature they also are used to fix the pole pieces 13 and 14 permanent magnet 12 and disc 10 to the base plate. The fixing is effected by means of nuts 28 and 29 as will be seen most clearly from FIGURE 4. The permanent magnet 12 is clamped between pole pieces 13 and 14.

Figure 8:
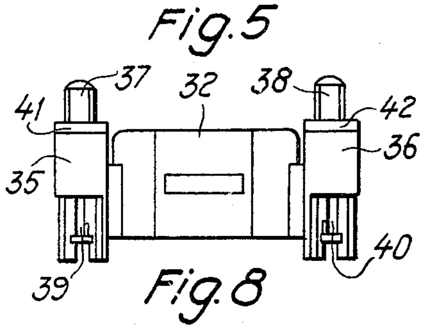
FIGURES 8 and 9 show a coil form with attached connecting means for the receiver in front view and top plan view respectively.
Figure 9:
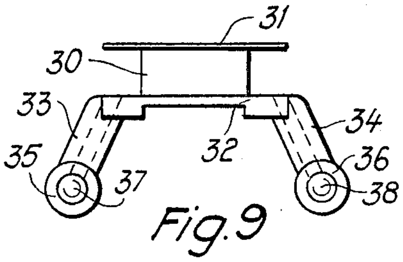

The energizing coil 16 consists of a winding wound on a coil form which is shown separately in FIGURES 8 and 9. The coil form has a tube-shaped core portion 30 and end pieces 31 and 32. The interior dimensions of the tube-shaped core portion 30 are sufficiently large to allow vibratory motion of the armature 15 within it. Two arms 33 and 34 extend from the end piece 32 at an angle to the axial direction of the coil form. Attached to the ends of arms 33 and 34 are cylindrical members 35 and 36 respectively. The coil form including the arms 33 and 34 and the cylindrical members 35 and 36 are made of insulating material and perferably in one integral piece. Metal pegs 37 and 38 are fitted into the cylindrical members 35 and 36. These metal pegs serve as connecting means for connecting the winding of the coil to an external circuit. The terminals of the coil winding are connected, for example by soldering, to the bottom portions 39 and 40 of the pegs 37 and 38. The portions 39 and 40 have preferably a smaller diameter than the rest of the pegs, and the cylindrical members 35 and 36 have parts of their walls removed to make the portions 39 and 40 of pegs 37 and 38 easily accessible to facilitate the application of the winding terminals thereto. Grooves indicated by dash lines in FIGURE 9 may be provided in arms 33 and 34 to accommodate the terminals of the winding. The pegs 37 and 38 and the cylindrical members 35 and 36 protrude through holes in the casing 2 as shown in FIGURES 1 and 2, and the protruding portions of the pegs may be threaded or formed in any other suitable manner to facilitate the connection of external conductors thereto.

The armature 15 is mechanically linked to the diaphragm 3 by means of a peg 41 for transferring the vibrations of the armature to the diaphragm. One end of peg 41 is soldered or welded into a recess in the free end of the armature and the other end is riveted to the center of diaphragm 3. For this purpose the other end of the peg is provided with a flange 42 abutting against one side of the diaphragm and a portion 43 piercing the diaphragm and staved towards the other side of the diaphragm as shown in FIGURES 1 and 2.

The base plate 1 and the disc 10 are provided with central openings. Such openings must of course be provided to allow the armature to be linked with the diaphragm by means of peg 41, but these openings also serve as an acoustic coupling between the two cavities *a* and *b* (FIGURE 2). Cavity *a* is between diaphragm 3 and base plate 1, while cavity *b* is enclosed by base plate 1 and casing 2. An acoustic damping member 44 is inserted in the central opening in the base plate 1. Member 44 is held in place by the diaphragm 3 and the edge of the central opening in the disc 10, the latter opening having a smaller diameter than the opening in the base plate 1. If desired a disc similar to disc 10 may be provided on the other side of the base plate so that the member 44 is held in place by the edges of the openings in these discs. In any case the central portion of the diaphragm should preferably be in contact with the damping member under a certain pressure so that the vibrations of the diaphragm are damped in desired degree.

The damping member 44 preferably consists of a porous elastic material such as foamed plastic, foamed rubber or the like.

Figure 10:
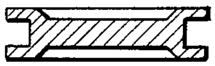
FIGURES 10 and 11 show an acoustical damping member used in the receiver in sectional view and top plan view respectively.
Figure 11:
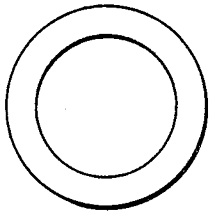

The damping member may also have the form shown in FIGURES 10 and 11, a U-shaped groove being provided in the edge of member to engage the edge of the opening in the base plate.

By suitable design and choice of material of the damping member 44 the acoustical damping of the air current between the two cavities *a* and *b* can be adjusted. The damping member reduces the Q factors of the cavities in the desired degree. The damping of the diaphragm can be adjusted by adjustably varying the pressure exerted by the damping member thereon.

By damping the air current produced by the diaphragm and/or placing the damping member in contact with the movable part of the diaphragm as described above the resonance peaks on the curve representing the sensitivity of the receiver as a function of frequency can always be suppressed.

Figure 12:
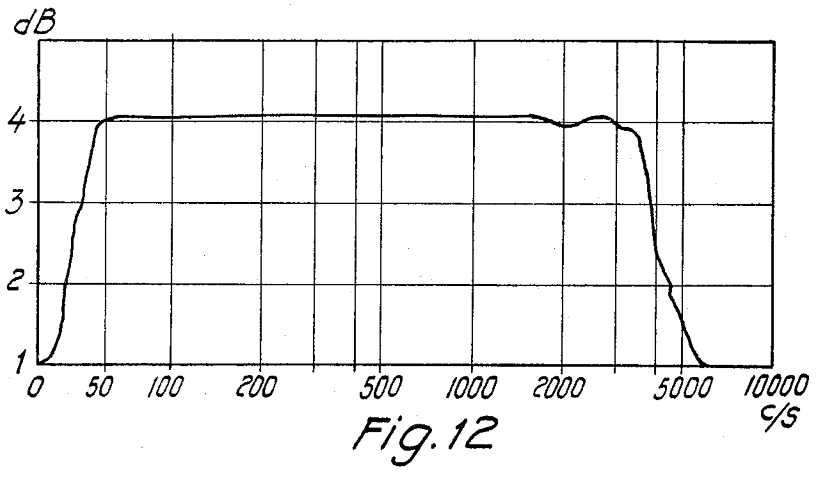
FIGURE 12 is a diagram showing the frequency response characteristic of the receiver.
Figure 13:
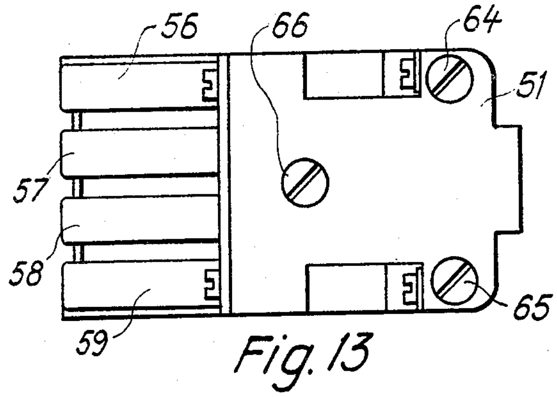
FIGURE 13 is a top plan view of a polarized relay embodying the invention.

FIGURE 12 shows a frequency response characteristic for a receiver according to the present invention. This characteristic was obtained as a result of practical tests with the receiver inserted in a subscriber's apparatus of conventional design, an alternating current of constant voltage 0.3 volt and varying frequency being applied to the apparatus. The amplitude value 4 decibel corresponds to a sound pressure of 30 microbars. It will be seen from the diagram that the sound pressure is practically constant and about 30 microbars within the frequency range from 40 to 3600 cycles per second.

FIGURES 13 to 17 illustrate the invention as applied to a polarized relay.

The polarized relay comprises two pole pieces 51 and 52, a permanent magnet 53, an armature 54, an energizing coil 55, and eight contact spring sets 56—63. The pole pieces 51 and 52 are clamped to the magnet 53 by means of screws 64, 65 and 66. Armature 54 is suspended by two springs 67 and 68. The armature is attached to the springs by means of screws, and the springs are in turn attached to the pole pieces by means of screws.

Figures 16, 17:
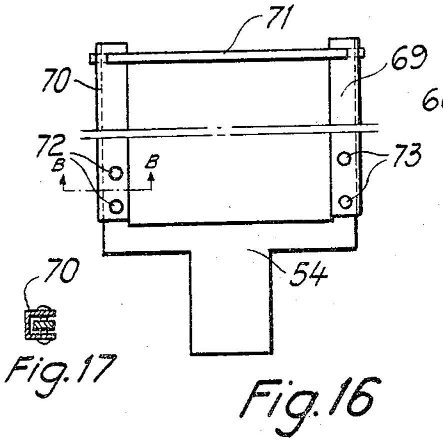
FIGURE 16 shows the armature of the polarized relay.
FIGURE 17 is a section taken along line B—B in FIGURE 16.
Figure 15:
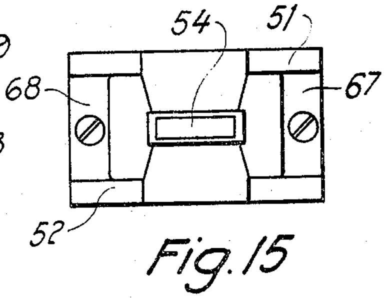
FIGURE 15 is a rear view of the polarized relay.
Figure 18:
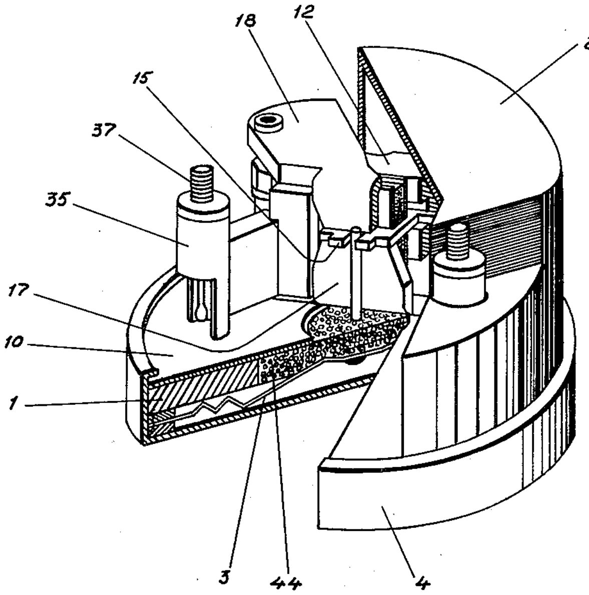
FIGURE 18 is an isometric view in partial section of the telephone receiver of the present invention.
Figure 19:
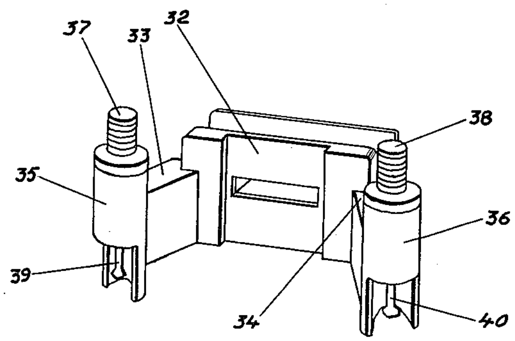
FIGURE 19 is an isometric view of the armature also shown in FIGURE 5.
Figure 20:
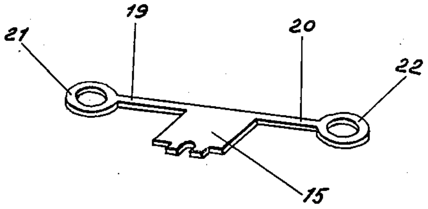
FIGURE 20 is an isometric view of the coil form also shown in FIGURES 8 and 9.
Figure 21:
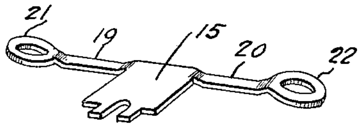
FIGURE 21 is an isometric view of a modified form of the armature.

As shown in FIGURE 16 the armature 54 is forked, the fork legs 69 and 70 extending on either side of magnet 54. The ends of these legs carry actuating means 71 for actuating the contact springs. The contact springs may be of any known design and are insulatingly fixed to the pole pieces 51 and 52.

Figure 14:
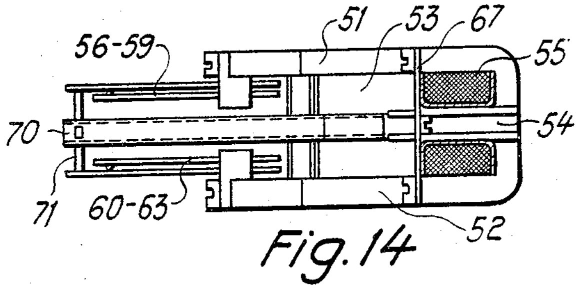
FIGURE 14 is a side view of the polarized relay.

As appears from FIGURES 14 and 16 the legs 69 and 70 are considerably longer than that portion of the armature which extends from the fulcrum through the coil 54 to the air gap between the pole pieces. Thus upon angular movement of the armature about its fulcrum the travel of that portion which carries the contact actuating means 71 will be considerably larger than the travel of that portion which is positioned in said air gap, the ratio of these travels preferably lying within the range from 3 to 10.

The legs 69 and 70 need not be of magnetic material but can be made of a light metal as for instance aluminium. In the shown embodiment the legs are profiled bars with an U-shaped cross section as shown in FIGURE 17. These bars are riveted to lateral projections from the magnetic part of the armature.

The armature is preferably balanced with respect to the fulcrum. Since the legs 69 and 70 can be made of a lighter material than the rest of the armature, it is always possible to make the armature balanced, even if said legs are considerably longer than that portion of the armature which extends from the fulcrum into the air gap between the pole pieces.

Polarized relays made in accordance with the invention require little space. Due to the large travel of the contact actuating means currents of very large power can be broken by means of the relay. Furthermore a large magnetic force is exerted on the armature. If for instance the armature has a thickness of 1.5 millimetre and a width at the poles of 8 millimetres, the force on the armature when no current flows through the coil may amount to about 700 grams. Therefore a large contact actuating force is obtained even if the above mentioned ratio of travel is large, and the relay can be equipped with a large number of contacts to be operated simultaneously.

While the invention has been disclosed in a few specific embodiments for the purpose of illustration, it will be understood that it may be embodied in other and different forms within the spirit and scope of the invention as defined in the appended claims.

What we claim is:

1. A polarized electromagnetic device comprising in combination: a pair of spaced members of magnetic material having pole faces defining an air gap; a permanent magnet positioned between said members for producing a polarizing flux through said members and across said air gap; an armature mounted between said members and extending from said permanent magnet into said air gap; said armature having two arms with a cross sectional area much smaller than that of the armature; supporting means for said arms; said arms extending from that part of the armature which is located nearest to the permanent magnet in alignment with each other and at right angles to the longitudinal direction of the armature and having their ends only fixedly attached to said supporting means, thereby permitting oscillation of the armature through torsional deflection in said arms; and an energizing coil surrounding part of the armature and located between the permanent magnet and said air gap.

2. A polarized electromagnetic device as defined in claim 1, wherein said armature is in the shape of a flat plate, and said arms have a thickness smaller than that of said plate.

3. A polarized electromagnetic device comprising in combination, a casing having an aperture, a permanent magnet, pole pieces in contact with each pole of the permanent magnet and having end portions facing each other to form an air gap, an armature pivoted adjacent to the permanent magnet and having a portion thereof positioned in said air gap, means securing said magnet, said pole pieces and said armature to said casing, and an energizing coil assembly positioned between the permanent magnet and said air gap, said energizing coil assembly including a winding on a coil form having an axial opening through which the armature extends, said coil form also having at least one projecting portion extending from the winding to the casing for independently supporting said energizing coil assembly, a metal connecting member protruding through said projecting portion and the aperture in said casing and terminal means on said coil electrically connected to said metal connection member for providing an electrical circuit connection from said coil to the exterior of said device.

4. A telephone receiver of the electromagnetic type comprising in combination, a diaphragm, a permanent magnet, pole pieces magnetically coupled to each pole of the permanent magnet and having end portions facing each other to form an air gap, a vibratory armature pivoted adjacent the permanent magnet and having a portion thereof positioned in said air gap, an energizing coil positioned between the permanent magnet and said air gap and surrounding part of said armature, linking means for transferring vibrations of the armature to said diaphragm, means forming a first acoustic resonant cavity and another cavity including a common wall to said cavities having an opening for coupling the cavities together acoustically, said diaphragm serving as a wall in one of said cavities, and acoustical damping material in said opening.

5. A telephone receiver of the electromagnetic type comprising, a base plate having a central opening, a diaphragm mounted adjacent to one side of said base plate, porous acoustic damping material covering said opening, a magnetic system mounted at the other side of said base plate, a casing attached to said base plate and enclosing said magnetic system and defining together with said base plate an acoustic resonant chamber, said magnetic system including a permanent magnet, pole pieces magnetically coupled to either pole of the permanent magnet and having end portions facing each other to form an air gap, an armature pivoted adjacent to the permanent magnet and having a portion positioned in said air gap, an energizing coil positioned between the permanent magnet and said air gap, said coil surrounding part at least of the armature, and a linking member having one end attached to the armature and its other end protruding through the acoustic damping means in said central opening in the base plate and attached to said diaphragm.

6. A polarized electromagnetic device comprising in combination: a pair of spaced members of magnetic material having pole faces defining an air gap; a permanent magnet positioned between said members for producing a polarizing flux through said members and across said air gap; an armature mounted between said members and extending from the permanent magnet into said air gap; said armature having the form of a substantially flat plate and having two arms extending from opposite sides of the end of the armature nearest to the permanent magnet; supporting means for said arms; said arms having a width smaller than that of the armature and being in alignment with each other and at right angles to the longitudinal direction of the armature and having their ends only fixedly attached to said supporting means, thereby permitting rotation of the armature under torsion in said arms; and an energizing coil surrounding part of the armature and located between the permanent magnet and said air gap.

7. A polarized electromagnetic device comprising in combination: a pair of spaced members of magnetic material having pole faces defining an air gap; a permanent magnet; means for clamping said permanent magnet between said members for producing a polarizing flux through said members and across said air gap; said permanent magnet having a recess therein extending in parallel with pole surfaces of the magnet and located midway between said pole surfaces; an armature consisting of a substantially flat plate of magnetic material mounted between said members and having a first end extending into said recess and a second end extending into said air gap; said first end of the armature having two arms with a cross sectional area much smaller than that of the armature, said arms extending in alignment with each other and at right angles to the longitudinal direction of the armature and having their ends only fixedly secured; and an energizing coil surrounding part of the armature and located between the armature and the air gap.

8. A polarized electromagnetic device comprising in combination: a casing having a pair of apertures; a permanent magnet; pole pieces in contact with each pole of the permanent magnet and having end portions facing each other to form an air gap; an armature pivoted adjacent to the permanent magnet and having a portion thereof positioned in said air gap; means supporting said magnet, said pole pieces and said armature in said casing; an energizing coil assembly positioned between the permanent magnet and said air gap, said energizing coil assembly including a winding composed of a number of turns of wire having an end terminal, said winding being on a coil form having an axial opening through which the armature extends, said coil form also having a pair of projecting portions extending from one end of the coil form and at opposite sides of the armature; a metal connecting member attached to each of said projecting portions and protruding through one of said apertures in said casing, said connecting member having means inside said casing for connecting thereto a terminal of the winding and means outside said casing for connecting thereto an external conductor.

9. A polarized electromagnetic device for use as electro-acoustic transducer, comprising in combination: a permanent magnet; pole pieces magnetically coupled to each pole of the permanent magnet and having end portions facing each other to form an air gap; an armature pivotally supported adjacent the permanent magnet and having one end extending through said air gap; an energizing coil positioned between the permanent magnet and the air gap and surrounding part at least of the armature; said permanent magnet, pole pieces, armature and energizing coil being enclosed by means including a first wall to be in a first cavity; a diaphragm forming a second wall which together with said first wall define a second cavity separated from said first cavity by said first wall; there being an aperture in said first wall; linking means extending through said aperture and connecting said diaphragm with said one end of the armature; and damping means of a porous elastic material extending into said aperture and being in contact with said diaphragm.

10. A polarized electromagnetic device as claimed in claim 9, in which said damping means consists of foamed plastic.

11. A polarized electromagnetic device for use as electro-acoustic transducer, comprising in combination: a permanent magnet; two pole pieces magnetically coupled to each pole of the permanent magnet and having end portions facing each other to form an air gap; an armature located between said pole pieces and having a first end adjacent to the permanent magnet and a second end extending through said air gap; said first end of the armature having two arms extending from said first end in alignment with each other and at right angles to the longitudinal direction of the armature and having their ends only fixedly attached to supporting means; said arms having a cross sectional area much less than that of the armature to permit rotation of the armature under torsion in said arms; an energizing coil surrounding part of the armature and being located between the permanent magnet and said air gap; means including a housing having a first compartment defining a first acoustical cavity enclosing the permanent magnet, pole pieces, armature and energizing coil; means including a second compartment in said housing defining a second acoustical cavity; said second cavity being separated from said first cavity by a wall having an aperture; a diaphragm forming a second wall of said second cavity; linking means extending through said second cavity and said aperture for connecting said diaphragm with said second end of the armature; and acoustical damping means of a porous elastic material in said aperture and being in contact with said diaphragm.

References Cited in the file of this patent

UNITED STATES PATENTS

| | | |
|---|---|---|
| 1,573,094 | Saal | Feb. 16, 1926 |
| 1,812,571 | Stunz | June 30, 1931 |
| 2,085,194 | Kellog | June 29, 1937 |
| 2,396,825 | Burroughs | May 14, 1946 |
| 2,454,425 | Bauer | Nov. 23, 1948 |
| 2,511,114 | Lavery | June 13, 1950 |
| 2,523,775 | Muldoon | Sept. 26, 1950 |
| 2,588,327 | Roberts | Mar. 4, 1952 |
| 2,692,918 | Berger | Oct. 28, 1954 |
| 2,761,929 | McLellan et al. | Sept. 4, 1956 |
| 2,803,713 | Miller | Aug. 20, 1957 |
| 2,906,828 | Carbonneau | Sept. 29, 1959 |

FOREIGN PATENTS

| | | |
|---|---|---|
| 2,137 | Great Britain | Dec. 7, 1889 |
| 136,526 | Australia | Feb. 28, 1950 |
| 233,733 | Great Britain | June 24, 1926 |
| 261,225 | Switzerland | Aug. 16, 1949 |
| 328,906 | Great Britain | May 8, 1930 |
| 354,413 | Great Britain | Aug. 13, 1931 |
| 497,074 | Canada | Oct. 20, 1953 |
| 500,150 | Italy | Nov. 17, 1954 |
| 1,133,358 | France | Nov. 19, 1956 |

OTHER REFERENCES

Application of Expanded Plastics, publication April 1950, pp. 93–95.